United States Patent
Bellwood et al.

(10) Patent No.: US 8,724,811 B2
(45) Date of Patent: *May 13, 2014

(54) BROADCAST ENCRYPTION BASED SECURITY SYSTEM

(75) Inventors: Thomas A. Bellwood, Austin, TX (US); Robert B. Chumbley, Round Rock, TX (US); Matthew F. Rutkowski, Pflugerville, TX (US); Alexander Tarpinian, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,042

(22) Filed: Sep. 14, 2012

(65) Prior Publication Data

US 2013/0022200 A1 Jan. 24, 2013

Related U.S. Application Data

(63) Continuation of application No. 11/348,902, filed on Feb. 7, 2006, now Pat. No. 8,325,926.

(51) Int. Cl.
*H04K 1/00* (2006.01)

(52) U.S. Cl.
USPC .................................................. 380/255

(58) Field of Classification Search
None
See application file for complete search history.

(56) References Cited

U.S. PATENT DOCUMENTS

| | | | |
|---|---|---|---|
| 5,345,549 A | 9/1994 | Appel et al. | |
| 6,046,750 A | 4/2000 | Fitzpatrick et al. | |
| 6,073,122 A | 6/2000 | Wool | |
| 6,118,873 A | 9/2000 | Lotspiech et al. | |
| 2003/0078029 A1* | 4/2003 | Petite | 455/404 |
| 2003/0198351 A1* | 10/2003 | Foster et al. | 380/281 |
| 2004/0064714 A1 | 4/2004 | Carr | |
| 2004/0117643 A1 | 6/2004 | Lakamp et al. | |
| 2005/0120246 A1 | 6/2005 | Jang et al. | |

FOREIGN PATENT DOCUMENTS

JP 2003-273894 A 9/2003

OTHER PUBLICATIONS

NURILOV, "Intro to Broadcast Encryption and Applications," Feb. 9, 2005, pp. 1-31.
IBM, "xCP: eXtensible Content Protection," 2003.
"Interoperable Home Infrastructure," Intel Technology Journal, v. 6 Issue 4, Nov. 15, 2002. ISSN 1535-766X.
USPTO, Office Action in U.S. Appl. No. 11/348,902, Apr. 28, 2009.
USPTO, Office Action in U.S. Appl. No. 11/348,902, May 12, 2010.

(Continued)

*Primary Examiner* — Brandon Hoffman
(74) *Attorney, Agent, or Firm* — Matthew B. Talpis; Gregory K. Goshorn; Greg Goshorn, P.C.

(57) ABSTRACT

Provided are techniques for providing a home or business security system that relies upon data encryption for both communication and the storage of content. The disclosed technology incorporates all the devices necessary for a comprehensive security system, including, but not limited to, controllers, monitors, alarms and communication media. The system may include an unlimited number of devices and, further, individual devices may be added and removed as needed. Users may define and change the boundaries of a security system or, in other words, decide what devices to include or not include in such a system. A defined boundary does not need to be confined to a single location. In one embodiment, the claimed subject matter incorporates xCP based broadcast encryption technology.

20 Claims, 6 Drawing Sheets

(56) References Cited

OTHER PUBLICATIONS

USPTO, Final Office Action in U.S. Appl. No. 11/348,902, Jan. 7, 2010.
USPTO, Final Office Action in U.S. Appl. No. 11/348,902, Oct. 27, 2010.
IBM, Response to Office Action in U.S. Appl. No. 11/348,902, Aug. 28, 2009.
IBM, Response to Office Action in U.S. Appl. No. 11/348,902, Apr. 7, 2010.
IBM, Response to Office Action in U.S. Appl. No. 11/348,902, Feb. 28, 2010.
IBM, Response to Office Action in U.S. Appl. No. 11/348,902, Aug. 12, 2010.

* cited by examiner

BROADCAST ENCRYPTION BASED SECURITY SYSTEM

CROSS-REFERENCES TO RELATED APPLICATIONS

The present application is a continuation and claims the benefit of the filing date of an application entitled, "Broadcast Encryption Based Home Security System" Ser. No. 11/348,902, filed Feb. 7, 2006, now U.S. Pat. No. 8,325,926, issued Dec. 2, 2004, assigned to the assignee of the present application, and herein incorporated by reference.

TECHNICAL FIELD

The present invention relates generally to a security system and, more specifically, to a wireless security system for a home or business that employs broadcast encryption.

BACKGROUND OF THE INVENTION

Today, many home and business owners require a security system for protection of valuable assets. Such systems can be complex and difficult to set up and are often inflexible because necessary modifications are difficult to implement. In addition, systems that have central control points can be compromised if the central control point is destroyed or otherwise disabled. Existing systems are also not conductive to integration with multiple security technologies, such as those incorporated with garage door openers, video surveillance equipment, and so on.

Recently, home and business security systems have started to evolve from proprietary, wired approaches toward open standards and wireless systems. Ideally, a system would employ devices such as, but not limited to, controllers, monitors, alarms, communication mechanisms, etc., integrated using a secure communication protocol. There are several secure communication protocols on the market today.

In the early 1970's, a private key encryption system called Data Encryption Standard algorithm (DES) was introduced, which uses a fifty-six (56) bit key to encrypt and decrypt information and communication. DES splits a message into blocks and then encodes each block. DES is no longer considered adequately secure because a 56 bit key can be broken in a relative short time by trying every possible key. DES has since been superseded by the Advanced Encryption Standard (AES), using what is known as the Rijudael algorithm. AES operates with 128, 192 or 256 bit keys. These keys are considered long enough to be safe for the foreseeable future as they would take millions of millions of years for the fastest currently available computers to break.

A second current method for protecting data and communication, is public key encryption, which has been around for approximately twenty-five (25) years. Public key encryption involves the use of two keys: a public key, known to everyone, and a private key, known only to the recipient of a message. Although public key encryption is very effective, there are several drawbacks when it is applied in the realm of digital communication and content storage. First, public key encryption is computationally expensive, i.e. public key systems require such significant computational capacity they are normally only used to implement a key exchange process within a private key encryption system, not to encrypt the body of a message. This process requires a two-way communication, which is not necessarily available in devices incorporated into a security system. Secondly, once the private key of a public key system has been compromised, the system becomes a shared key system. Thirdly, once a public key system has been compromised, there is no practical method for "revoking" the compromised private key.

A recent development in the field of encryption of digital data and communication is broadcast encryption. Broadcast encryption is based upon a key management block (KMB), which is a block of data sent at the beginning of a broadcast or is prerecorded on blank media during the manufacturing process. One of the largest advantages to broadcast encryption is that two devices, which might be previously unknown to each other, can agree upon a key over a one-way communication path. This advantage makes broadcast encryption ideal for the communication between two security system components.

The International Business Machines Corporation (IBM) of Armonk, N.Y., a leader in broadcast encryption, has developed a data encryption system referred to as eXtensible Content Protection (xCP) designed for networks and media distribution. This technology is based on broadcast encryption and supports the notion of a trusted domain that groups together compliant devices. Content can freely move among devices within the trusted domain but is useless to devices that are outside of the domain. xCP provides a cryptographically strong yet extremely flexible model for access to copy-protected content within a network of devices such as a home or business security system.

Based on IBM's experience with broadcast encryption, xCP was designed to meet the following requirements:
1. Cryptographically strong;
2. Easy to use, if not transparent, to consumers;
3. Low compute requirements;
4. Exclusion/renewal in the case of a breach:
5. Compatible with rights management and other copy protection systems; and
6. Encourages the implementation of new content owner business models. Extensible content protection (xCP) makes use of the key management scheme described by broadcast encryption and can be thought of as a superset of the successful content protection technology used and licensed today by IBM on DVDs, High Definition DVDs (HDVDs) and Compact Disks (CDs) called Content Protection for Recordable Media (CPRM).

Public-key based systems, which require devices to have a two-way conversation to establish a key, are almost impossible to completely divorce from an underlying transmission protocol. The IBM xCP Cluster Protocol may be the first system directed to peer devices based upon broadcast encryption as the underlying cryptographic technology. Devices that implement the xCP Cluster Protocol and its broadcast encryption mechanisms are said to "bind" the content they protect to a particular entity (e.g. a home network or cluster) by encrypting the content with a different key, called the binding key (Kb), than the one produced by processing a KMB, as explained below. All current approaches to binding a piece of content to a particular entity, regardless of whether it is a piece of media, a device, or a user, is through one level of indirection in the calculation of the encryption keys. In these cases, the procedure to encrypt a piece of content is roughly the following:

1. Extract a Management Key (Km) by processing the KMB.
2. Perform a one-way function to a piece of data that uniquely identities the entity this content is being bound to (or the "IDb"), using Km and resulting in a binding key (i.e. Kb=G(Km, IDb)).
3. Choose a random title key (Kt) for this piece of content and encrypt it using Kb, resulting in an encrypted title key (EKt) (i.e. EKt=E(Kb, Kt)).

4. The content is encrypted with the Kt and then the encrypted content is stored in conjunction with the EKt. Once the procedure has been implemented, any compliant device that has access to the same KMB, IDb and EKt can decrypt a communication or content by reproducing the same Kb and decrypting Kt.

In various binding scenarios there is more than one piece of content that is bound to the same entity and, at the same time, either the KMB or IDb can change. The result of this is that the value of Kb changes and thus all the existing title keys need to be re-encrypted with the new value of Kb—otherwise, no device would be able to open the content again. It should be noted that encrypted content of this nature is routinely exchanged and/or copied between entities which participate in the described binding scheme.

What is needed is a home security system implemented according to a broadcast encryption scheme. In this manner, devices can be added and removed from the system and there is no requirement that any particular device remain in communication with the system.

SUMMARY OF THE INVENTION

Provided is a novel method for providing a home or business security system that relies upon data encryption for both communication and the storage of content, for example, images from surveillance cameras. The disclosed technology incorporates all the devices necessary for a comprehensive security system, including, but not limited to, controllers, monitors, alarms and communication media. The system may include an unlimited number of devices and, further, individual devices may be added and removed as needed. Users may define and change the boundaries of a security system or, in other words, decide what devices to include or not include in such a system. A defined boundary does not need to be confined to a single location because the claimed subject matter makes geography irrelevant.

In one embodiment, the claimed subject matter incorporates xCP based broadcast encryption technology. Security control points, such as door and window sensors, control pads, sirens, web-cams, and so on, are implemented as xCP capable wireless devices, which participate in a single xCP network cluster. The specific geographical location of a device is not important within the disclosed system, only that the device is able to communicate with the security network cluster. Continuous attachment to the network is not necessary. For example, a device such as a garage door remote control is part of the system when within close proximity to a corresponding garage door opener and also remains part of the cluster when too geographically distant to communicate.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following figures, in which.

DETAILED DESCRIPTION OF THE FIGURES

Although described with particular reference to a home security system, the claimed subject matter can be implemented in any security system in which flexibility is desirable. Those with skill in the computing arts will recognize that the disclosed embodiments have relevance to a wide variety of environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for implementing a security system for a home, business or other type of location. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
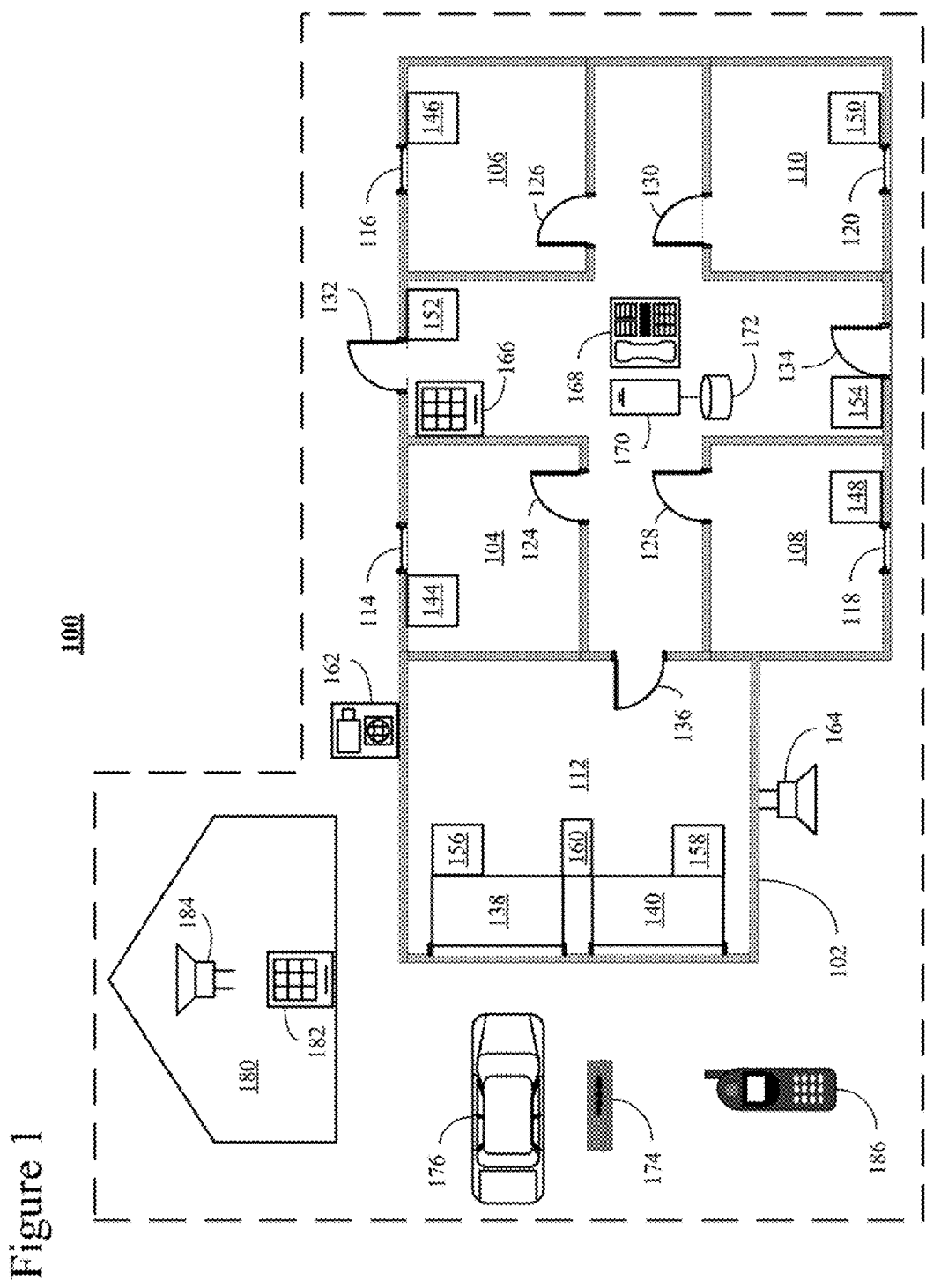
FIG. 1 is a block diagram of a home security system that incorporates the claimed subject matter.

FIG. 1 is a block diagram of a home security system 100 that incorporates the claimed subject matter. In the following example, although security system 100 is primarily directed to protecting a house 102, it should be noted that the disclosed technology is equally applicable to any home, business, storage locker, or other type of structure that requires a security system.

House 102 includes four (4) rooms 104, 106, 108 and 110 and a garage 112. Rooms 104, 106, 108 and 110 have windows 114, 116, 118 and 120, respectively, and interior doors 124, 126, 128 and 130, respectively, House 102 includes two (2) exterior doors 132 and 134 and a door 136 that opens into garage 112. Garage 112 has two (2) overhead doors 138 and 140.

Numerous security components are installed in conjunction with security system 100. Components installed in conjunction with windows 114, 116, 118 and 120 are window sensors 144, 146, 148 and 150, respectively. Installed in conjunction with exterior doors 132 and 134 are door sensors 152 and 154, respectively. Garage doors 138 and 140 have door sensors 156 and 158, respectively, and are opened and closed by a garage door opener 160. House 102 also has a video surveillance camera 162 and a siren 164 that are incorporated into security system 100. A control pad 166 provides user access for activating, deactivating and performing other control functions with respect to system 100.

System 100 also integrates a telephone 168 that provides communication capabilities. Telephone, which can be either wired or wireless, is only one example of possible communication options. Other examples include, but are not limited to, cable, radio, networks and other types of connections. A CPU 170 provides logic for controlling and accessing system 100. Coupled to CPU 170 is data storage 172 that stores logic associated with security system 100 and data and messages generated by system 100.

System 100 also includes remote components. A garage door opener controller 174 communicates via radio frequencies with garage door opener 160. Typically, opener 174 is positioned in an automobile 176, which, in accordance with the claimed matter, may or may not be communicatively coupled with system 100. Unlike convention security systems, system 100 may have authenticated components that are brought in and out of system 100 at will. In addition, system 100 may include components located off-site, such as at a neighbor's house 180. In this example, neighbor's house 180 is the location of a second control pad 182 and a second siren 184.

Finally, a cellular telephone 186 is configured to function as a component of security system 100. As with any other component, once telephone 186 is added to system 100 (see FIG. 3), telephone 186 can send commands and receive messages from system 100. In other words, telephone 186 enables a user to activate, disable and monitor system 100 from any place in which telephone 186 can place and receive a call. Another telephone (not shown), which is not authenticated with system 100 would not be able to perform those management and monitoring functions.

Figure 2:
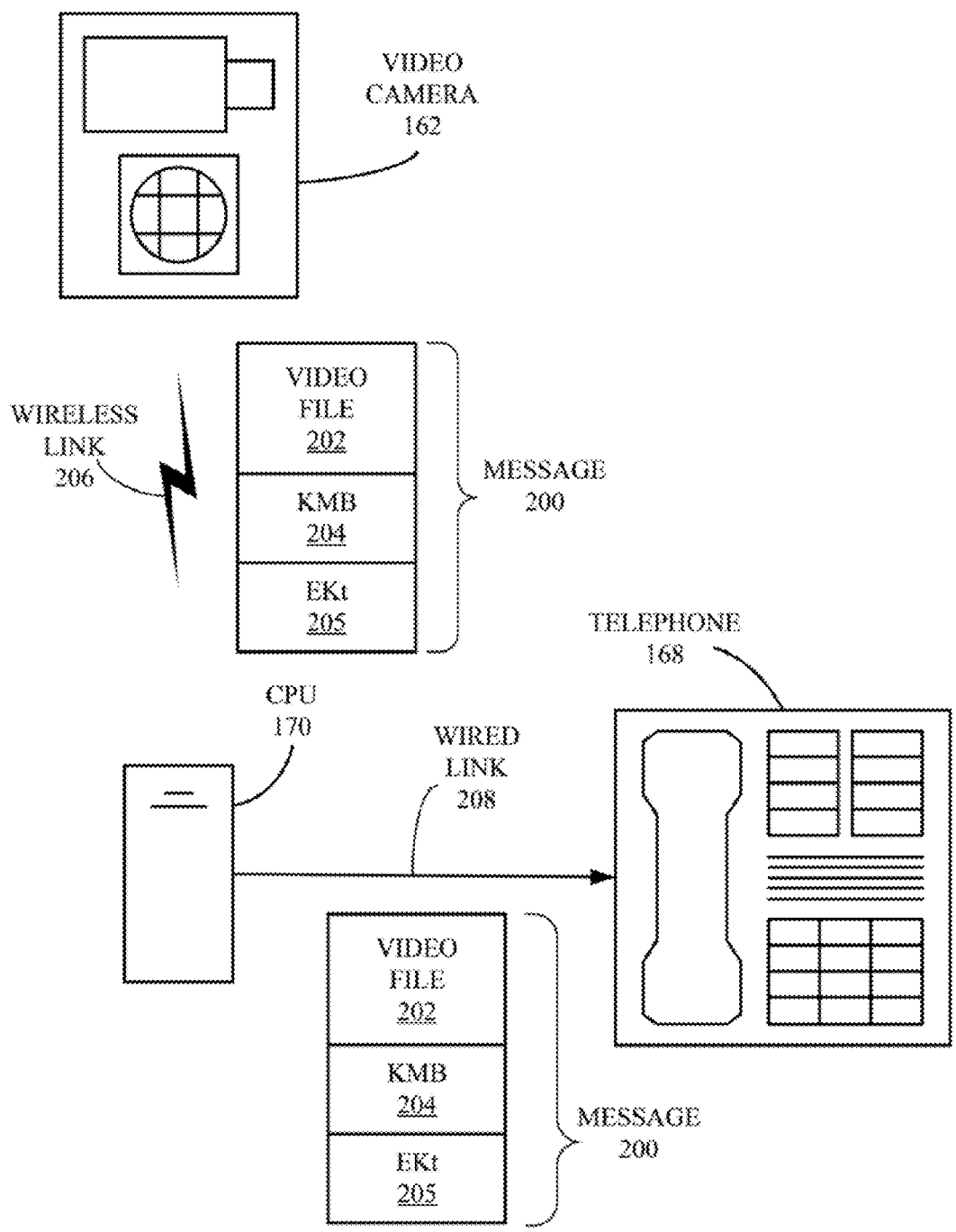
FIG. 2 is a block diagram of a transmission of a message among three exemplary components of the home security system of FIG. 1.

FIG. 2 is a block diagram of a transmission of a message 200 among three exemplary components, i.e. first from video camera 162 (FIG. 1) to CPU 170 (FIG. 1) and, secondly, from CPU 170 to telephone 168 (FIG. 1) of home security system 100 (FIG. 1). Message 200 includes three (3) components: an encrypted video file 202, a key management block (KMB) 204 and an encrypted title key (EKt) 205. The function of KMB 204 and EKt 205 are explained in more detail below in conjunction with FIGS. 3-6.

Encrypted video file 202 is used only as an example of one type of encrypted message; a message 200 can be almost any type of file such as, but not limited to, a request or a command for a service from one device to another device in security system 100. In this example, video file 202 represents data captured by video camera 162 and transmitted to CPU 170 for storage. Message 200 is transmitted from camera 162 to CPU 170 via a wireless link 206 and, then, from CPU 170 to telephone 168 via a wired link 208. Although not shown, message 200 could then be transmitted from telephone 168 to any number of locations. For example, message 200 may be transmitted to a third component of system 100 or to an off-site location (not shown), which may or may not be an authorized component of security system 100. It should be understood that CPU 170 may have multiple options for the transmission of a message other than telephone 168 including various wireless and wired links. The claimed subject matter is equally applicable to any type of transmission media. Further, the message transmitted form CPU 170 to telephone 168 could be a message other than message 200. For example, once CPU 170 receives message 200, CPU 170 may generate a notification message and a corresponding KMB (not shown) that is transmitted via telephone 168 to cellular telephone 186 (FIG. 1).

Figure 3:
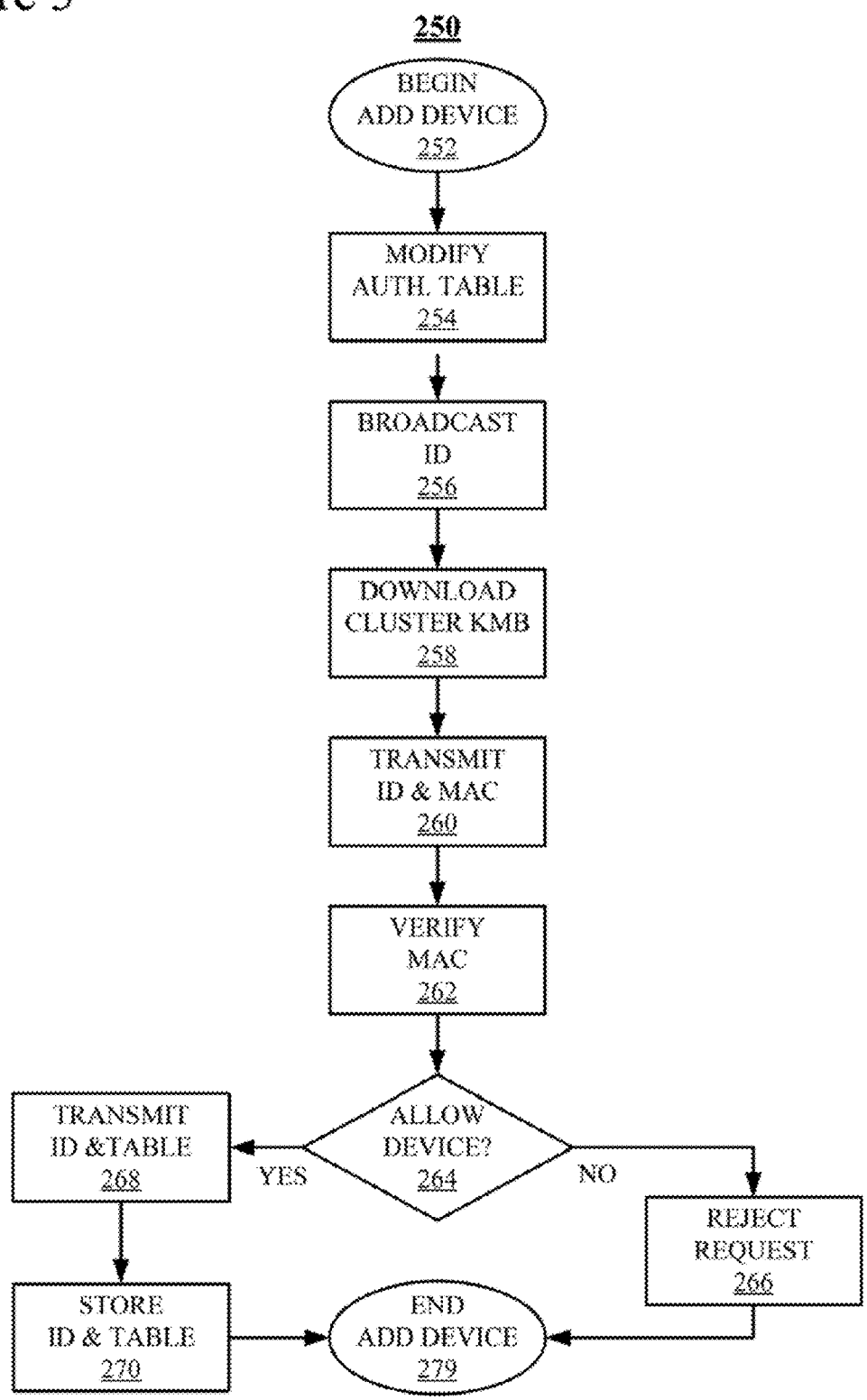
FIG. 3 is a flowchart of an Add a Device Process corresponding to the security system of FIG. 1.

FIG. 3 is a flowchart of an Add Device Process 250 corresponding to the security system 100 of FIG. 1. For the purposes of this example, the device being added to system 100 is garage door opener controller 174 and the device that adds controller 174 (FIG. 1) is CPU 170 (FIG. 1). It should be noted that any device added to system 100 must be "authenticated" by process 250 and that any device in system 100 may be configured to execute the necessary processing to add a device although, typically, at most one or a few devices are responsible for the management functions represented by process 250.

Process 250 starts in a "Begin Add Device" block 252 and proceeds immediately to a "Modify Authentication (Auth.) Table" block 254. During block 254, a system administrator or other authorized user must add a reference to the device that is to be added, i.e., in this example, controller 174, to an authentication table (not shown) stored in conjunction with the device that performs the authentication, i.e., in this example, CPU 170. In the alternative, an authorization table with all the possible devices that may be added could be preinstalled on CPU 170.

Once the reference to controller 174 has been included in the authorization table of CPU 170, controller 174 broadcasts a message to the devices of security system 100 during a "Broadcast ID" block 256. During a "Download Cluster KMB" block 258, CPU 170, which has received the message broadcast during block 256, transmits, and controller 174 receives, a KMB, such as KMB 204 (FIG. 2), associated with the message broadcast during block 256.

During a "Transmit ID & MAC" block 260, controller 174 transmits to CPU 170 the ID transmitted during block 256 and a message authentication code (MAC) that is calculated using the KMB downloaded during block 258. During a "Verify MAC" block 262, using the ID and MAC transmitted during block 260, CPU 170 verifies that controller 174 is entered in the authorization table (see block 254). During an "Allow Device?" block 264 CPU 170 determines whether or not controller 174 should be granted access to system 100. One criterion is that controller is listed in the authorization table and a second criterion is that the addition of controller 100 does not cause a limit on the number of devices in system 100 to be exceeded.

If process 250 determines that controller 174 should not be admitted to system 100, control proceeds to a "Reject Request" block 266 during which controller 174 is notified that the registration request was rejected and the steps necessary to resolve the situation may be taken. If during block 264, CPU 170 determines that controller 174 is authorized to join system 100, process 250 proceeds to a "Transmit ID & Table" block 268. During block 268, CPU 170 transmits, and controller 174 receives, a cluster ID (IDb) that is encrypted in a manner such that only controller 174 can decrypt and a copy of the authorization table. The transmitted IDb is generated by CPU 170 and is different from the cluster ID that has been employed by system 100 up to that time. It should be noted that CPU 170 transmits the new cluster ID and authorization table to all the components of system 100. This is necessary because the addition of controller 174 has caused the authorization table to change. By requiring periodic updates of both the cluster ID and authorization table, system 100 can both make it more difficult to gain unauthorized access and remove unauthorized devices from system 100.

Figure 4:
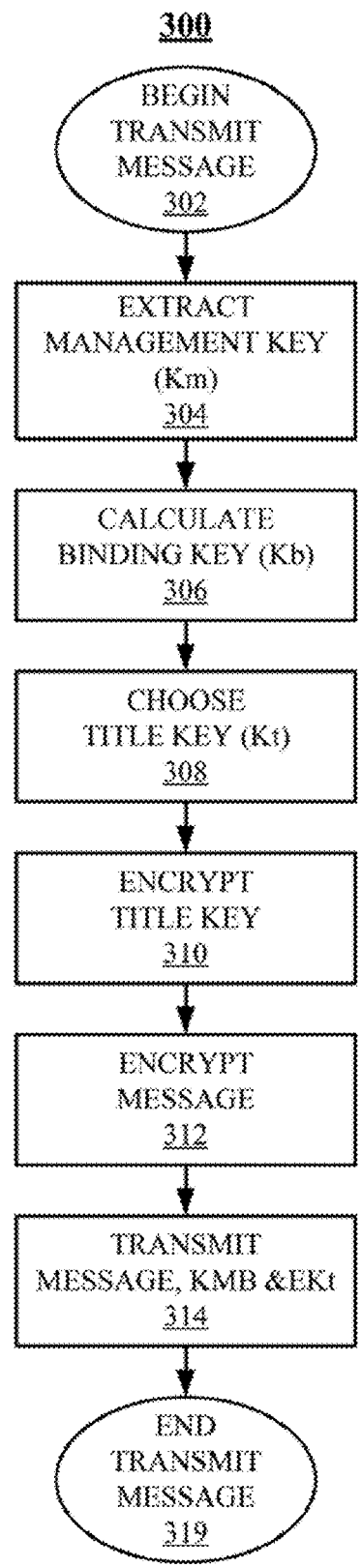
FIG. 4 is a flowchart of a Send Message process employed in conjunction with one implementation of the claimed subject matter.
Figure 5:
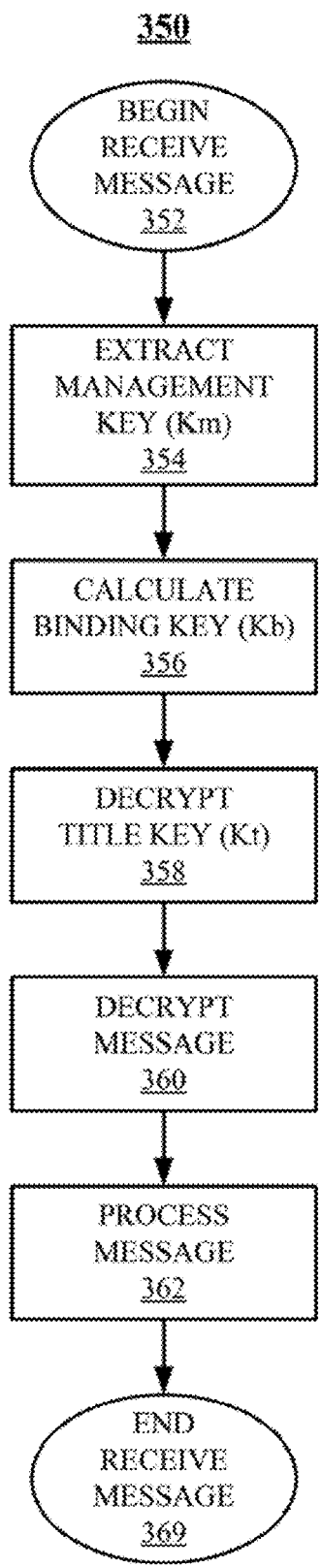
FIG. 5 is a flowchart of a Receive a Message process corresponding to the Send a Message process of FIG. 4.
Figure 6:
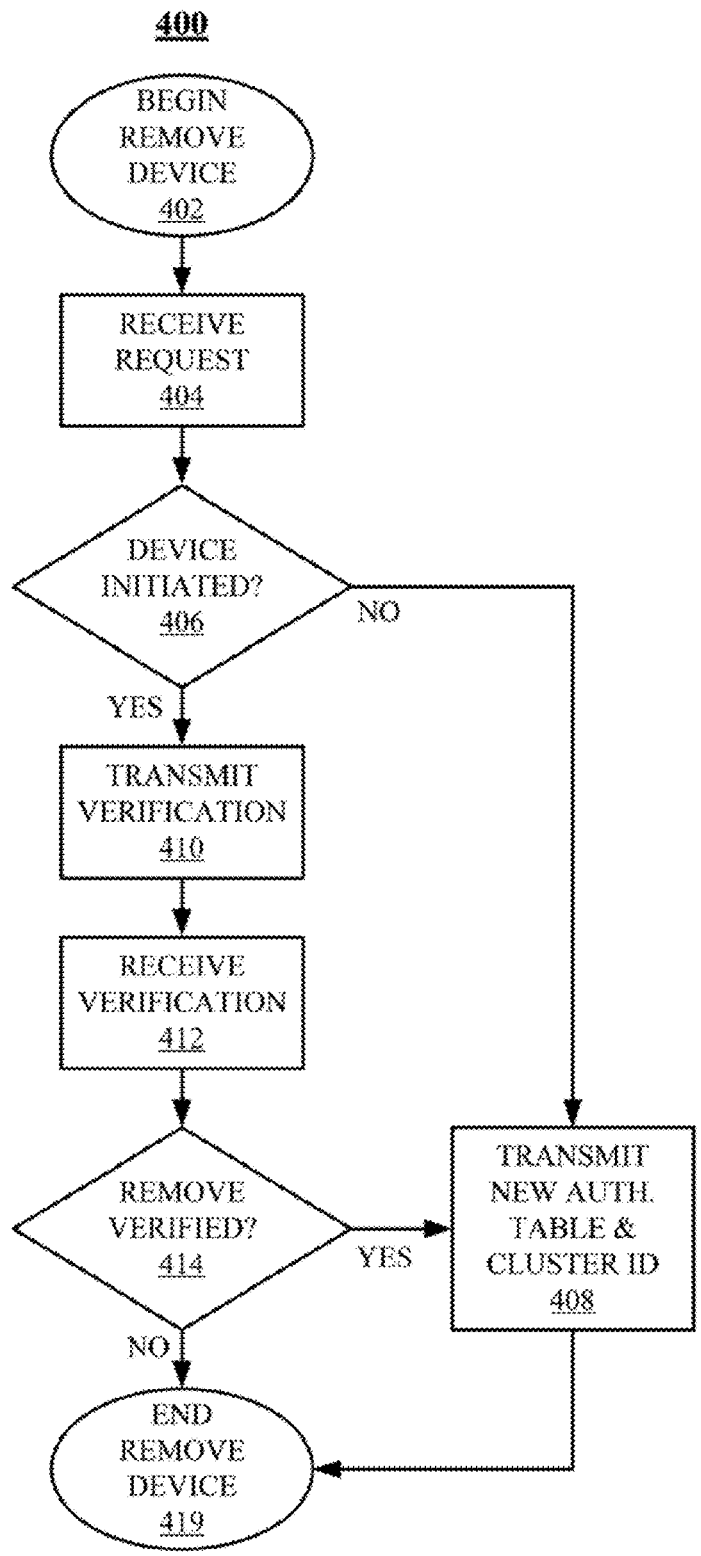
FIG. 6 is a flowchart of a Remove a Device Process corresponding to the security system of FIG. 1.

During a "Store ID & Table" block 270, controller 174 decrypts the cluster ID transmitted during block 268 and stores the decrypted cluster ID and the new authorization table for future use (see FIGS. 4-6). Finally, once controller 174 has stored the cluster ID during block 270 (or been rejected for entry into system 100 during block 266), process 250 proceeds to an "End Add Device" block 279 in which processing is complete and controller 174 has been added (or rejected).

FIG. 4 is a flowchart of a Transmit Message process 300 employed in one implementation of the claimed subject matter. In this example, process 300 is described as executing on video camera 162 (FIG. 1) for the purpose of transmitting message 200 (FIG. 2) containing captured image 202 (FIG. 2) to CPU 170 (FIG. 1) and data storage 172 (FIG. 1). Of course, any transmission from one component of security system 100 (FIG. 1) to any other component employs process 300 to ensure the privacy and integrity of communications and commands.

Process 300 starts in a "Begin Transmit Message" block 302 and proceeds immediately to an "Extract Management Key (Km)" block 304. The management key (Km) is produced by processing KMB 204 (FIG. 2) associated with message 200, or, for the purpose of this example, the "current" message. During a "Calculate Binding Key (Kb)" block 306, process 300 executes a one-way function, i.e. "G", to a piece of data that uniquely identifies current message 200, or the "IDb", using Km, the cluster ID and the authorization table, resulting in a binding key, i.e. Kb=G(Km, IDb⊗[Authorization Table]).

During a "Choose Title key (Kt)" block 308, process 300 generates a random title key (Kt) for this piece of content 202 and, during an "Encrypt Title Key" block 310, encrypts Kt using Kb, resulting in EKt 205 (FIG. 2), i.e. EKt=E(Kb, Kt). Message 202 is encrypted with the Kt during an "Encrypt Message" block 312.

Finally, during a "Transmit Message, KMB, & EKt" block 314, encrypted message 202 and the corresponding KMB 204 and EKt 205 are transmitted to CPU 170 for storage in data storage 172. Process 300 then proceeds to an "End Transmit Message" block 319 in which process 300 is complete.

FIG. 5 is a flowchart of a Receive Message process 350 employed in conjunction with Transmit Message process 300 of FIG. 4. In the following example, CPU 170 is executing process 350 to receive message 200 (FIG. 2) from video camera 164 (FIG. 1).

Process 350 starts in a "Begin Receive Message" block 352 and proceeds immediately to an "Extract Management Key (Km)" block 354. During block 354, process 350 extracts Km from KMB 204 and during a "Calculate Binding Key (Kb)" block 356 uses Km and the cluster ID and authorization table transmitted to CPU during Download Cluster ID block 268 (FIG. 3) of Add Device process 250 (FIG. 3). Briefly, the calculation of Kb is expressed as function (G such that Kb=G (Km, IDb⊗[Authorization Table]).

During a "Decrypt Title Key (Kt)" block 358, process employs the Kb calculated during block 356 to generate Kt from encrypted title key (EKt) 205 transmitted in conjunction with KMB 204 and, then during a "Decrypt Message" block 360, employs Kt to decrypt video file 202 of message 200. Finally, during a "Process Message" block 362, process 350 takes whatever action required in conjunction with message 200 and proceeds to an "End Receive Message" block 369 in which process 350 is complete. In the example above, the action associated with message 200 is the storage of video file 202 in data storage 172. In other situations, message 200 may be a command that necessitates action, e.g. a message from controller 174 (FIG. 1) to signal garage door opener 160 (FIG. 1) to open one or both garage doors 138 and 140 (FIG. 1).

FIG. 6 is a flowchart of a Remove Device Process 400 corresponding to the security system of FIG. 1. Reasons a device might be removed from security system 100 include but are not limited to, because a particular device is broken, lost or stolen. In this example, process 400 is executed on CPU 170 (FIG. 1) and is directed to controller 174 (FIG. 1).

Process 400 starts in a "Begin Remove Device" block 402 and proceeds immediately to a "Receive Request" block 404 during which CPU 170 receives a request to remove controller 174 from security system 100. A request may be transmitted by a device requesting to be removed or by a system administrator who desires to remove a device for some reason such that the device has been lost, broken of stolen.

During a "Device Initiated?" block 406, process 400 determines whether or not the request received during block 404 is from a device requesting removal. If not, i.e. a system administrator is initiating the removal, process 400 proceeds to a "Transmit New Authorization Table & Cluster ID" block 408. During block 408, process 400 generates a new authorization table, without a listing for the device to be removed, and a new cluster ID and transmits the table and cluster ID to the remaining devices in security system 100. In this manner, the removed device is unable to access material broadcast by any of the devices remaining in security system 100. It should be noted that prior to transmitting any content or messages, new Kt's must be generated for each message or content corresponding to the new cluster ID.

If, during block 406, process 400 determines that the device to be removed appears to be the device that initiated the message received during block 404, process 400 generates a request for verification message and transmits the message to the device that is apparently requesting removal during a "Transmit Verification" block 410. During a "Receive Verification" block 412, process 400 receives a reply to the message transmitted during block 410. During a "Remove Verified?" block 414, process 400 determines whether or not the message received during block 412 confirms that the device requests removal. If so, process 400 proceeds to Transmit New Authorization Table & Cluster ID block 408 and processing continues as described above.

Finally, if, during block 414, process 400 determines that the removal request was not from the targeted device, process 400 proceeds to an "End Remove Device" block 419 in which process 400 is complete. In addition, process 400 proceeds from block 408 to block 419 once the device has been removed form the authorization table and a new cluster ID generated.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A security system, comprising:
   a plurality of security components associated with physical assets of a facility;
   a cluster that binds the plurality of physical components into a secure configuration for the protection of the physical assets; and
   logic for:
   transmitting, using broadcast encryption, an encrypted message between a first component and second component of the physical components;
   decrypting the encrypted message text to produce a decrypted text message; and
   executing a command transmitted in the decrypted message on the second component.

2. The security system of claim 1, wherein the transmission of the encrypted message is via a wireless protocol based upon xCP broadcast encryption.

3. The security system of claim 1, the logic, for decrypting the encrypted message, comprising:
   logic for decrypting an encrypted title key (ETk) to generate a title key (Kt); and
   logic for decrypting the encrypted message using the Kt.

4. The security system of claim 1, wherein the security system is a home security system.

5. The security system of claim 1, wherein the security system is a business security system.

6. The security system of claim 1, wherein the security components are from a list comprising:
   a door alarm;
   a window alarm;
   a keypad.

7. The security system of claim 1, further comprising a third component at a remote location incorporated into the cluster.

8. A method, comprising:
   grouping a plurality of security components associated with physical assets of a facility into a cluster that binds the plurality of components into a secure configuration for the protection of the physical assets;
   transmitting an encrypted message from a first component of the plurality of security components to a second component of the plurality of security components, wherein the transmitting of the encrypted message is via broadcast encryption;
   decrypting, the encrypted message to produce a decrypted message; and
   executing a command transmitted in the decrypted message on the second component.

9. The method of claim 8, wherein the transmission of the encrypted message is via a wireless protocol based upon xCP broadcast encryption.

10. The method of claim 8, the logic for decrypting the encrypted message, comprising:
    logic for decrypting an encrypted title key (ETk) to generate a title key (Kt); and
    logic for decrypting the encrypted message using the Kt.

11. The method of claim 8, wherein the security system is a home security system.

12. The method of claim 8, wherein the security system is a business security system.

13. The method of claim 8, wherein the security components are from a list comprising:
    a door alarm;
    a window alarm;
    a keypad.

14. The method of claim 8, wherein a third component at a remote location is incorporated into the cluster.

15. A computer programming product, comprising: a non-transitory computer-readable storage medium; and logic stored on the non-transitory computer-readable storage medium for execution on a processor, for: grouping a plurality of security components associated with physical assets of a facility into a cluster that binds the plurality of components into a secure configuration for the protection of the physical assets; transmitting, via broadcast encryption, an encrypted message from a first component of the plurality of security components to a second component of the plurality of security components; decrypting, at the second component, the encrypted message to produce a decrypted message; and executing a command transmitted in the decrypted message on the second component.

16. The computer programming product of claim 15, wherein the physical assets comprise a home.

17. The computer programming product of claim 15, wherein the physical assets comprise a business.

18. The computer programming product of claim 15, wherein the security components are selected from a list comprising:
    a door alarm;
    a window alarm;
    a keypad.

19. The computer programming product of claim 15, the logic for executing a command on the second component comprising logic for deactivating an alarm.

20. The computer programming product of claim 15, the logic for executing a command on the second component comprising logic for activating an alarm.

* * * * *